E. A. BARBET.
APPARATUS FOR THE CONTINUOUS PRODUCTION OF ETHER.
APPLICATION FILED JULY 5, 1919.

Patented Nov. 21, 1922.

Patented Nov. 21, 1922.

1,436,332

UNITED STATES PATENT OFFICE.

EMILE AUGUSTIN BARBET, OF PARIS, FRANCE, ASSIGNOR TO E. BARBET & FILS ET CIE., OF PARIS, FRANCE.

APPARATUS FOR THE CONTINUOUS PRODUCTION OF ETHER.

Original application filed May 5, 1916, Serial No. 95,613. Divided and this application filed July 5, 1919. Serial No. 308,897.

*To all whom it may concern:*

Be it known that I, EMILE AUGUSTIN BARBET, a citizen of the French Republic, and residing at 5 Rue de l'Echelle, Paris, France, have invented certain new and useful Improvements in Apparatus for the Continuous Production of Ether, of which the following is a specification.

This invention relates to the production of ether.

It is known that the reaction between sulphuric acid and ethyl alcohol which produces ethyl ether comprises two stages:—

In the first stage the alcohol is dissolved in the acid to produce the compound ethyl sulphuric acid.

In the second stage the ethyl sulphuric acid is decomposed by heat, with the formation of ether.

This ether however is not pure as it contains a certain amount of undecomposed alcohol which depends upon the greater or less predominance of the acid in the mixture treated.

Hitherto the formation and decomposition of the ethyl sulphuric acid has usually been effected in one and the same boiler or vessel although these two operations are essentially opposed to each other. It has however been proposed to effect the formation of ethyl sulphuric acid, and the decomposition of the said acid in two stages.

The present invention has now for its object to provide an improved apparatus for the continuous production of ether.

The invention will be described in detail with reference to the accompanying drawings which illustrate by way of example two forms of apparatus, in accordance with the invention. In the drawings:—

The first stage of the process which consists in causing the alcohol to combine with the sulphuric acid is effected in the apparatus according to the present invention in the following manner:

The alcohol passes into a tubular heater A wherein it is converted into vapour. This vapour is led by a pipe B into the bottom of a device C which is lead lined and contains dividing materials such as porcelain balls, lead plates perforated with small holes, or a charge of broken quartz in which device the alcohol and sulphuric acid are brought together.

The bottom of the device C in which the alcohol is caused to react with the sulphuric acid communicates by a pipe D' with the lower part of a boiler D containing acid at a high temperature. The acid from which the ether has been distilled flows from the lower part of the boiler D through the pipe D' into the lower part of the device C.

The acid and the alcohol are thus brought into intimate contact in the device C wherein the dividing materials merely cause the bubbles of vapour to become subdivided in the acid, thus providing a greater number of contacts for the purpose of increasing the combining points of the alcohol with the acid to facilitate the production of ethyl sulphuric acid.

The ethyl sulphuric acid formed in the device C enters through a pipe C' into the upper part of the boiler D which is made of metal plate lined with lead. This boiler contains a leaden heating coil E in which steam under pressure circulates. The ethyl sulphuric acid which has already a high temperature on its entry into the boiler, is thereby further heated; decomposition of the ethyl sulphuric acid takes place and the ether vapour rises to the top of the boiler whence it is withdrawn for rectification. It will be seen that the flow of the liquid in C is upward and in D downward thus ensuring completeness of the reaction and certainty of flow.

When the ethyl sulphuric acid reaches the bottom of the boiler D it contains necessarily a predominance of sulphuric acid (or a deficiency of ethyl sulphuric acid) and hence when it passes through the pipe D' it is in the best condition for recommencing its cyclic process and for again combining with alcohol in the vessel C.

The sequence of the two stages takes place in the apparatus according to the invention regularly under the conditions which are best for each of them. The first stage is effected in the absence of any heating, whilst in the other stage the heating is the fundamental feature of the operation.

Figure 2:
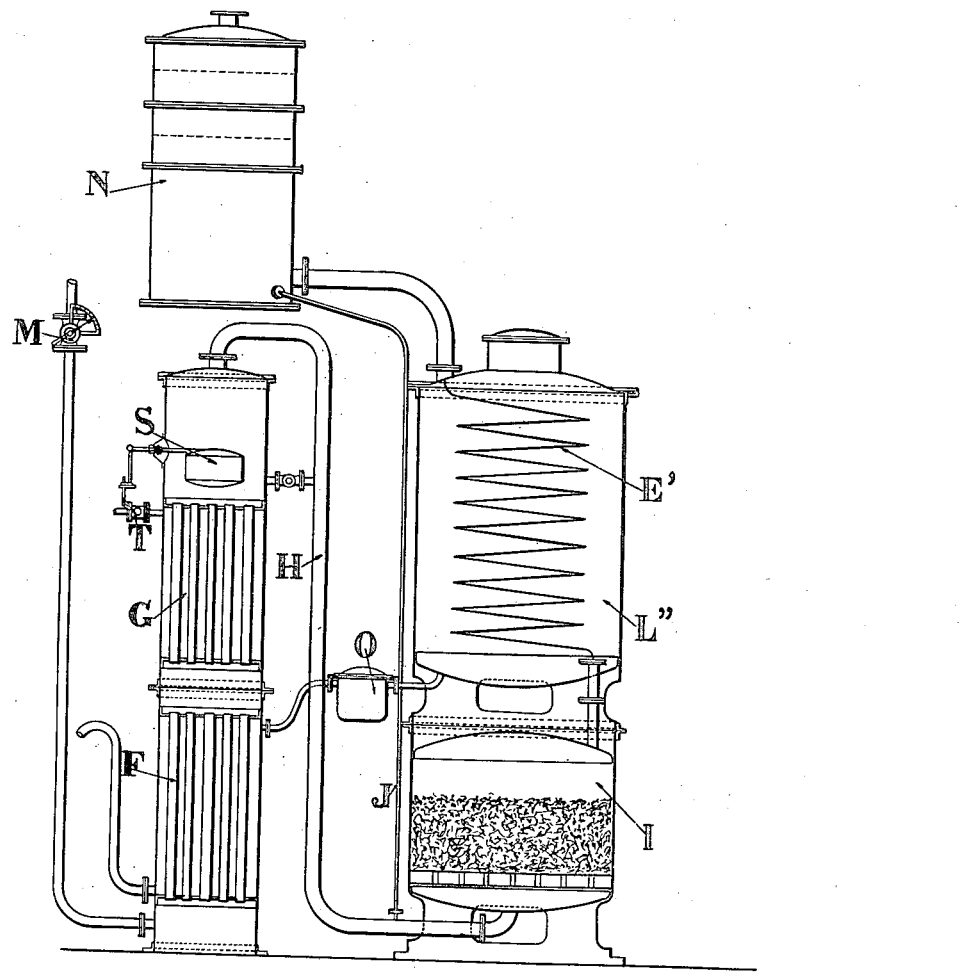
Figure 2 is a corresponding view of the second apparatus.

Referring now to the second apparatus according to the invention illustrated in Figure 2:

F G is a tubular apparatus for heating the alcohol and is hereinafter referred to in detail.

The alcohol after passing through the tubular apparatus enters through the pipe H into the chamber I in which the combination of the alcohol and sulphuric acid takes place after having come into contact with the acid which enters the pipe H from the pipe J.

This device in which the ethyl sulphuric acid is decomposed contains as in the preceding case, dividing materials or perforated plates.

The formation of ethyl sulphuric acid is effected in a complete manner in the chamber I by reason of the intimate mixture of the acid and alcohol, and the ethyl sulphuric acid passes into the coil E' located in the vessel L" and the steam under pressure is led into the said vessel (which vessel and the supports for the coil consequently need not be made of lead) so that it heats the ethyl sulphuric acid to cause the decomposition of the latter thereby effecting the second stage of the process, involved in the production of ether.

The acid which is saturated with alcohol commences to boil as soon as it enters the coil. Being driven forward by the bubbles of vapour it rises more and more rapidly in the convolutions of the coil and issues forcibly into the receiver N (which may form the lower member of an ordinary saturator).

The alcohol is fed in through the regulator M into the bottom of the tubes of the heater F and thence rises through the open space connecting the two heaters and through the tubes of the heater G'.

The ether vapours are thus driven off and then the acid partially freed from ether flows down again through the pipe J for the purpose of being treated to increase its content of ethyl sulphuric acid afresh, and the cycle of the two stages is repeated continuously as before.

Mitscherlich in studying the processes of the etherification of alcohol, recognized that the phenomenon was identically the same whether the alcohol was injected in the liquid state into the acid or injected in the state of vapor into the acid.

When it is desired to inject the alcohol in the liquid state it is merely necessary to dispense with the tubular vessels A, F, G, in the two forms of apparatus hereinbefore described, and to supply the alcohol in the cold state directly through the pipe B or pipe H.

In the apparatus shown in Figure 2, the preheating of the alcohol is effected without cost by recovery of the heat of the water of condensation which is produced in the vessel L" by means of the automatic discharge device O. If desired, to this hot water there may be added the residual liquors of the rectifier (not shown).

Figure 1:
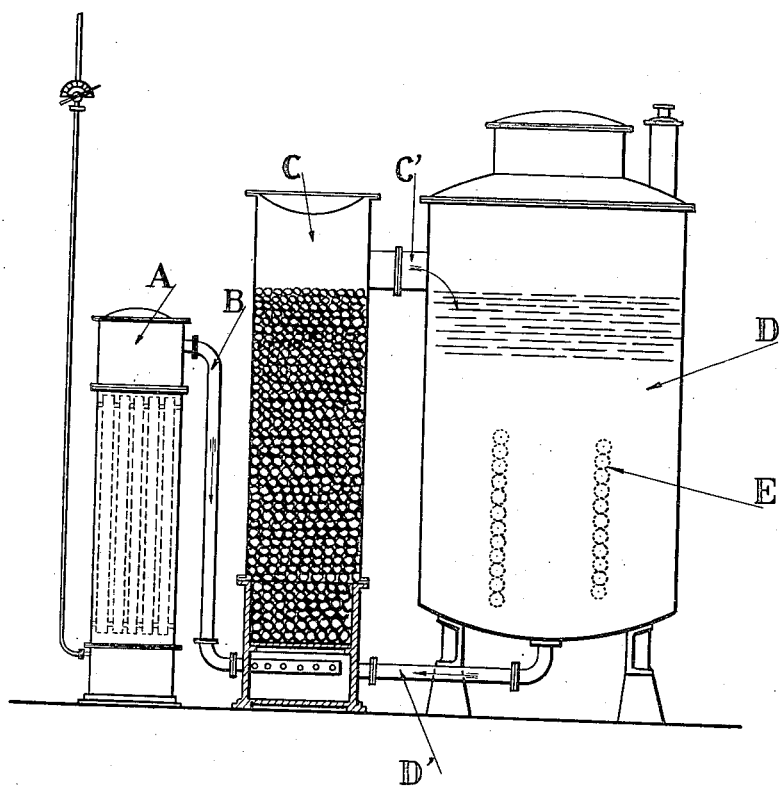
Figure 1 is a diagrammatic sectional elevation of the general arrangement of one apparatus.

If it is preferred to inject the alcohol in the state of vapour, either the apparatus shown in Figure 1 (heater A) or the apparatus shown in Figure 2 (heaters G and F) may be employed.

The heater G differs from the heater F in that it is provided with a steam regulator. It is preferred to employ expanded or exhaust steam of 100° to 105° C since the alcohol is subject to partial decomposition at high temperatures. The volume of alcohol which is to be introduced is regulated by means of the trap M. The heater G should be supplied with just the amount of steam which is necessary for producing the vapour. For this purpose the boiling alcohol acts upon a float S which acts in its turn through suitable levers upon the handle of a throttle valve T provided at the inlet of the heating steam. When too much steam enters the level of the alcohol sinks since the vaporization is excessive, whereupon the throttle valve will be partially closed. If on the other hand the level tends to rise through insufficient vaporization, the float will also rise and thus open more the orifice for the admission of heating steam.

It is to be noted that in addition to the advantages hereinbefore stated, the improved apparatus allows of employing always the same acid which is constantly being regenerated with the same degree of hydration, and only a small quantity of acid is used.

Having now described my invention, what I claim as new and desire to secure by Letters Patent is:—

1. Apparatus for the continuous production of ether comprising a tubular alcohol heater, means for leading the alcohol vapour formed in said heater from the top thereof to the base of a mixing device, means for leading to the base of the mixing device hot sulphuric acid poor in ethyl sulphuric acid, means for leading the acid product rich in ethyl sulphuric acid from the head of said mixing device to a boiler, means for leading away from the top of said boiler the ether formed therein and means for returning the acid substantially freed from ether to the mixing device.

2. Apparatus for the continuous production of ether comprising a tubular alcohol heater, means for leading the alcohol vapour formed in said heater from the top thereof to the base of a mixing device, means for leading to the base of the mixing device hot sulphuric acid poor in ethyl sulphuric acid, means for leading the acid product rich in ethyl sulphuric acid from the head of said mixing device to a sulphuric acid boiler, tubular means arranged within said boiler to heat the sulphuric acid therein, means for leading ether from the head of said boiler and means for leading sulphuric acid substantially free of ether from the base of said boiler to the base of the mixing device.

In testimony whereof I have signed my name to this specification.

EMILE AUGUSTIN BARBET.